INVENTOR.
DONALD H. CRISS.
ERWIN P. POLLITT
BY
ATT'Y.

March 28, 1972     D. H. CRISS ET AL     3,652,751

METHOD AND APPARATUS FOR BLOW MOLDING PLASTIC ARTICLES

Filed June 20, 1969     6 Sheets-Sheet 4

INVENTOR.
DONALD H. CRISS.
BY ERWIN P. POLLITT
Philip M. Rice
& E. J. Holler
ATT'Y.

March 28, 1972  D. H. CRISS ET AL  3,652,751
METHOD AND APPARATUS FOR BLOW MOLDING PLASTIC ARTICLES
Filed June 20, 1969  6 Sheets-Sheet 5

INVENTOR.
DONALD H. CRISS.
BY ERWIN P. POLLITT
Philip M. Rice
E. J. Holler
ATT'Y.

March 28, 1972  D. H. CRISS ET AL  3,652,751
METHOD AND APPARATUS FOR BLOW MOLDING PLASTIC ARTICLES
Filed June 20, 1969  6 Sheets-Sheet 6

INVENTOR.
DONALD H. CRISS.
BY ERWIN P. POLLITT
Philip M. Rice
& E. J. Holler
ATT'Y.

United States Patent Office 3,652,751
Patented Mar. 28, 1972

3,652,751
METHOD AND APPARATUS FOR BLOW MOLDING PLASTIC ARTICLES
Donald H. Criss, Toledo, Ohio, and Erwin P. Pollitt, Glencoe, Ill., assignors to Owens-Illinois, Inc.
Filed June 20, 1969, Ser. No. 835,091
Int. Cl. B29c 17/07
U.S. Cl. 264—99
15 Claims

ABSTRACT OF THE DISCLOSURE

A plastic blow molding machine for the manufacture of bottles or the like articles and capable of extremely rapid operation, multiple molds being used to successively engage spaced portions of a continuously extruded vertically disposed tube. The closed molds move vertically with the tube during blowing, and each mold in succession opens to release the blown article, the opened mold returning toward the extrusion orifice by passing around the next consecutive, closed mold. This "hand-over-hand" operation forms a series of blown articles linked together by non-blown waste portions.

To speed up the cycle, a purely mechanical drive system is utilized, eliminating any delays for limit switch operation, valve opening and the like. The vertical drive for the molds incorporates cranks driven from a common crankshaft, and the mold opening and closing movements are also driven from this crankshaft. Rotary valves on the crankshaft control the introduction and exhaust of blown air. The resultant apparatus is extremely simple, foolproof and the sequencing of the method steps is carried out automatically.

The molds are refrigerated in order to reduce the mold-closed time, the mold itself receiving gaseous refrigerant directly from the evaporator of a refrigeration unit.

BACKGROUND OF THE INVENTION

In known blow molding machines and methods, a considerable portion of the time required for a blowing cycle is occupied by the chilling of the blown plastic article. This chilling occurs when the plastic parison which is being blown contacts the walls of the blow mold, and heat is then transferred out of the hot plastic material into the metal of the blow mold. As the plastic material cools, it solidifies or sets. Normally, the blow molds are cooled as with water or other liquid coolant in order to cut down the time required for chilling and thus speed up production.

In order to further increase production rates, it has recently been proposed to refrigerate injection molds, so that they will be maintained at a very low temperature, well below the freezing point of ordinary liquid coolants. Thus, when the hot plastic material contacts the metal of the mold, it will be cooled extremely rapidly to achieve a minimum chilling time. It has been proposed in such previous systems to accomplish the refrigeration of the mold by making the mold the evaporator of a refrigeration system through which a refrigerant such as Freon is circulated.

In the working system of this invention, cooling passages are provided through or in contact with the mold, and vaporized refrigerant, which is essentially gaseous Freon or the like is passed directly from the evaporator through the cooling passages. Heat removed from the hot plastic material in the mold is absorbed by the already vaporized refrigerant, thus transferring heat to the refrigerant. The refrigerant vapors are conducted from the mold to a compressor, from there to a condenser, and ultimately back through an expansion valve into the evaporator and then through the cooling passages in the blow mold, to provide a refrigeration circuit. Suitable temperature control means may be provided for automatically adjusting the temperature of the blow mold to meet cooling requirements.

By refrigerating molds in this manner, it is possible to greatly reduce the chilling time required to solidify or set the plastic material after it has contacted the mold.

By refrigerating a blow mold or molds to obtain such short chilling times, it should be possible to obtain very high rates of production. However, in order to realize maximum production rates, the blow molding machine must operate at very high speed and the other machine functions must be speeded up. This may involve high torques, high inertia forces, and relatively great acceleration of parts, and the machine must be designed to handle these forces. It has been found that known blown molding machines are not suitable for operation at the high speeds required to obtain maximum benefit from the advantages of refrigerating the blow molds to minimize chilling time.

SUMMARY OF THE INVENTION

The blow molding machine of the invention as disclosed herein includes two blow molds in vertical alignment, an extruder mounted above the blow molds to supply a plasticized plastic parison downwardly along a vertical path passing through the blow molds, cams for reciprocating the blow molds vertically out of phase with respect to each other, and cams connected to the blow molds to close each blow mold during the downward travel thereof and open each blow mold during the upward travel thereof, so that the closed blow mold pulls the parison down and the open blow mold passes upward outside the closed blow mold. Gas is supplied under pressure to each blow mold during the downward travel thereof to inflate the mold-enclosed portion of the parison into a blown article. The machine is capable of high speed operation, and to accomplish the rapid chilling of the blown articles required for such high speed operation, refrigerant is conducted in heat exchange relation with the blow molds as they travel. Each blow mold is connected in a refrigeration circuit including a compressor receiving vaporized refrigerant from the blow mold, a condenser connected to the compressor, an expansion valve and an evaporator connected between the valve and the blow mold. The blow mold receives gaseous refrigerant directly from an evaporator in this circuit. The pressurized blow air or other gas introduced into each blow mold exerts considerable blowing force on the blow mold after the parison has expanded. In order to hold each blow mold closed against this blowing force, a mold biasing mechanism is provided including a cam actuated spring.

The method of the invention includes the steps of (1) extruding a hot plasticized plastic parison vertically downward, (2) closing a first blow mold on a portion of the parison, (3) moving the first blow mold downwardly with the parison and concurrently supplying gas under pressure into the parison portion within the blow mold to inflate the parison portion to a blown shape, (4) closing a second blow mold on a portion of the parison above the first parison portion, and (5) opening the first blow mold. The steps are then repeated with the second blow mold moving downward and the first blow mold moving upward. The cycle continues to blow a series of articles in the parison. The blow molds are continuously refrigerated as they travel.

Accordingly, it is an object of the present invention to provide a method of and apparatus for blow molding plastic articles at very high production rates.

Another object of the invention is to provide a method of and apparatus for blow molding plastic articles in which the blow molding cycle time is reduced by refrigerating the blow molds and by utilizing a completely mechanical actuating system.

Another object of the invention is to provide a blow molding method and apparatus in which two blow molds alternately close on and travel downwardly with a downwardly extruded parison, and an article is blown in each blow mold as it travels downwardly, the motions of the blow molds being controlled by cams.

Another object of the invention is to provide a blow molding method and apparatus in which opening and closing movement of vertically reciprocating blow molds are controlled by cams.

A further object of the invention is to provide a blow molding machine having reciprocating blow molds which open and close during their cycle, means for supplying blown air under-pressure to each blow mold during a portion of its cycle, and mold-reciprocating means, mold-opening and closing means, and blow air-supplying means actuated from a common drive shaft.

Other objects of this invention will appear in the following description and appended claims, reference being had to the accompanying drawings forming a part of this specification wherein like reference characters designate corresponding parts in the several views.

Before explaining the present invention in detail, it it is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The blow molding machine 20 has a frame including a base 22, upright posts 24 and horizontal cross members 26. A horizontal plate 28 is attached to posts 24 above the base 22. A plate may likewise be provided at the top of the machine, but this plate is not shown in FIG. 2 so as to reveal the working mechanisms. A conventional extruder 30 (somewhat schematically illustrated in FIG. 1) is mounted on the top of the machine with its exit and 32 pointing downward. The extruder 30 includes a screw 34 therein with drive means 36 for rotating the screw being provided outside the extruder. A hopper 38 communicates via a conduit 40 with the inside of the extruder, so that plastic material may be continuously supplied into the extruder from the hopper. Heat is supplied to the extruder by a conventional heating system (not shown), and the screw 34 is rotated to plasticize the plastic material and extrude a hot, tubular parison 42 of plasticized plastic material through an orifice at an exit end 32 of the extruder. The parison 42 passes vertically downward through the machine. Obviously, a horizontally disposed extruder provided with a "goose-neck" orifice arrangement can be utilized to provide the vertical parison 42.

Figure 4:
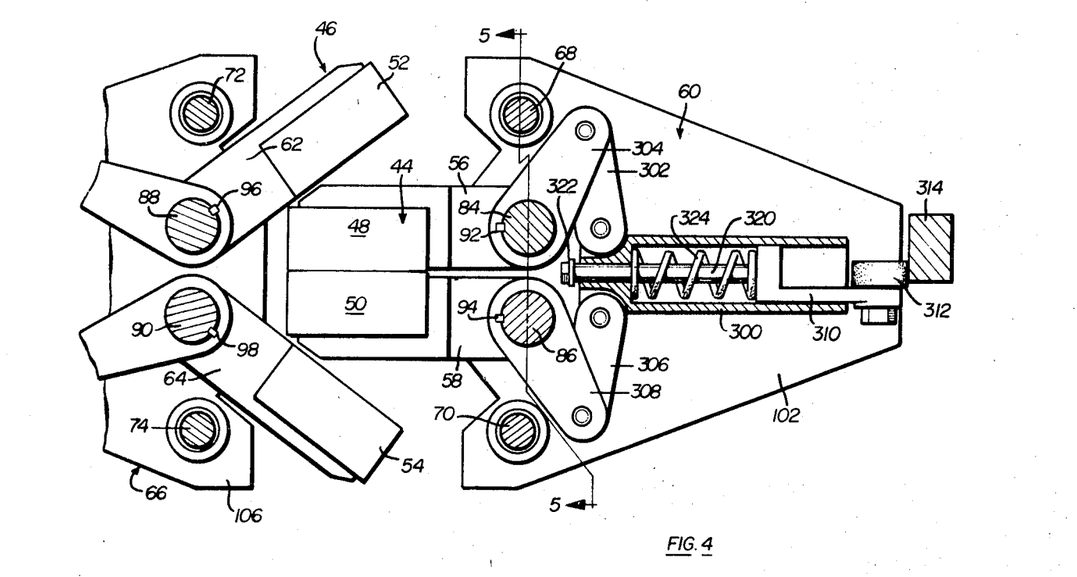
FIG. 4 is a fragmentary sectional view of the blow molds and associated structure included in the machine, the blow molds being in different positions than in FIG. 1.
Figure 5:
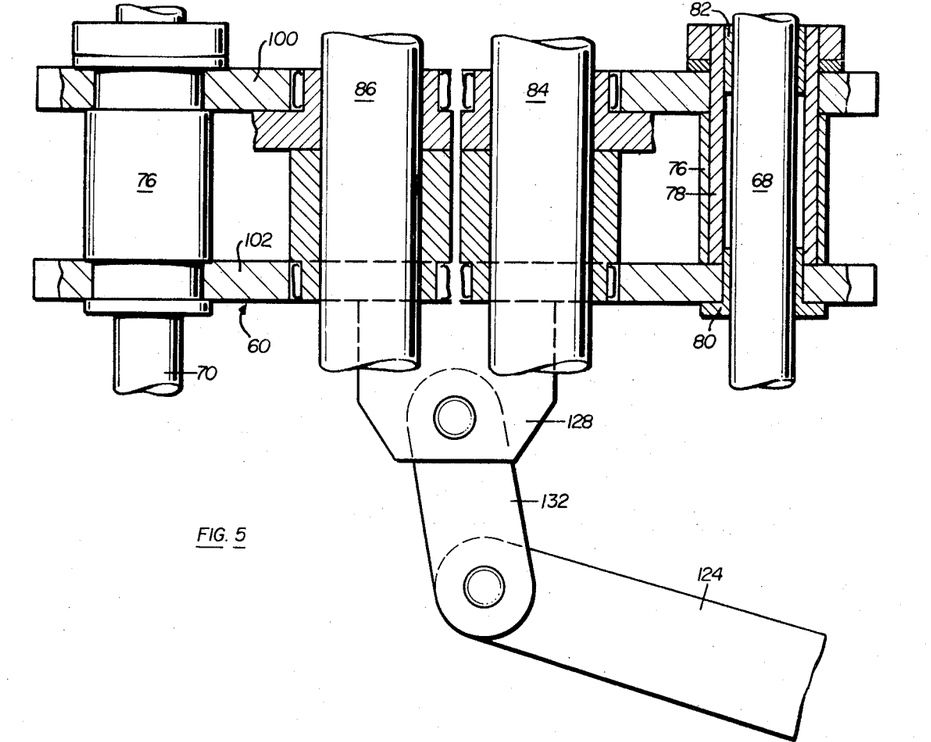
FIG. 5 is a sectional view taken along line 5—5 of FIG. 4.

A pair of blow molds 44 and 46 (shown in detail in FIG. 10) are provided in vertical alignment with each other below the extruder so that the dependent parison 42 can pass through the blow molds when they are open. Blow mold 44 includes two mold halves 48 and 50, and blow mold 46 also includes two mold halves 52 and 54, these mold halves being most clearly visible in FIG. 4. Mold halves 48 and 50 are secured respectively to arms 56 and 58 which are pivotally connected to a carrier 60, and blow mold halves 52 and 54 are secured respectively to arms 62 and 64 which are pivotally connected to another carrier 66. Carrier 60 is slidable vertically on two vertical guide posts 68 and 70 secured to plate 28 and the top plate of the machine. Similarly, carrier 66 is slidable vertically on two guide posts 72 and 74 mounted on plate 28 and the plate at the top of the machine. The guide posts pass through the respective carriers, and as shown in FIG. 5 in connection with guide post 68, each guide post is surrounded by sleeves 76 and 78 with bushings 80 and 82 therein. Also extending through carrier 60 are two vertical shafts 84 and 86 journaled for rotation, and extending through carrier 66 are two more vertical shafts 88 and 90 also journaled for rotation.

Arms 56 and 58 are connected to shafts 84 and 86 respectively by keys 92 and 94 (FIG. 4), and arms 62 and 64 are connected to shafts 88 and 90 respectively by keys 96 and 98. The keys allow the arms to slide freely vertically along the shafts, but connect the arms to the shaft so that the arms can be moved by rotation of the shafts.

Carrier 60 consists of two horizontal plates 100 and 102 connected together by spacers, such as sleeves 76, and carriers 66 likewise consists of two horizontal plates 104 and 106 connected together by spacers. The arms 56, 58, 62, 64 for the blow molds 44, 46 are received between the plates 100, 102, 104, 106 of the carriers along with other operating mechanism as will be described.

The two blow molds 44, 46 are reciprocated vertically out of phase with respect to each other along the vertical path followed by the parison 42. Vertical motions of the blow molds are controlled by two box cams 108 and 110 (FIG. 2) which are respectively connected to the carriers 60 and 66 by linkages generally designated 112 and 114. Box cams 108 and 110 are mounted on a horizontal rotary shaft 116. Cams 108 and 110 are provided with circular grooves 118 and 120 which are eccentric relative to shaft 116, as illustrated by the cam groove 118 shown in dashed lines in FIG. 3. The other cam groove 120 is 180 degrees out of phase relative to cam groove 118.

Figure 2:
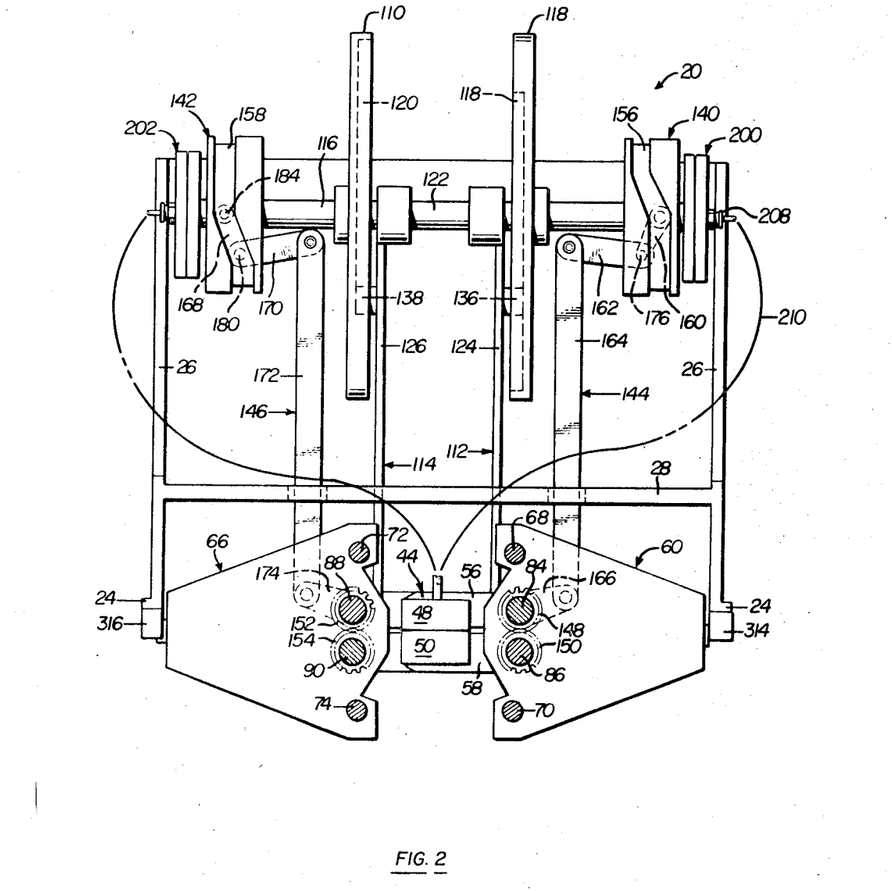
FIG. 2 is a top plan view of the machine of FIG. 1.
Figure 3:
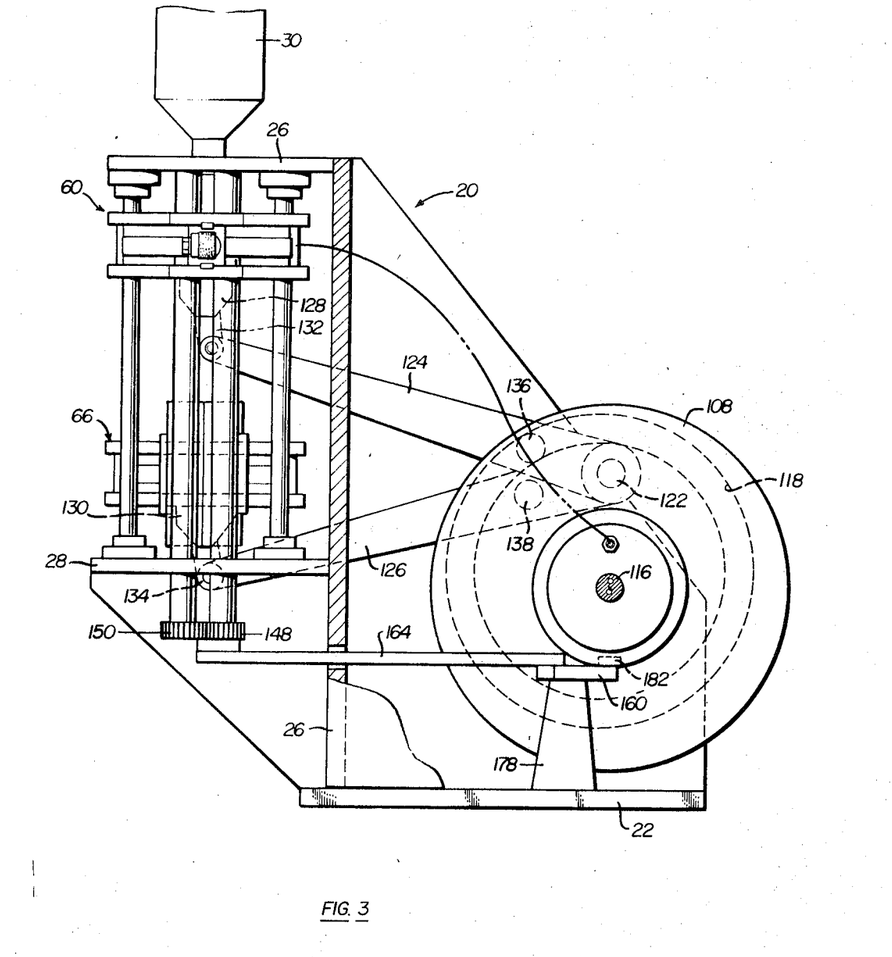
FIG. 3 is a side elevational view of the machine.

A stationary hub 122 is located above shaft 116, and arms 124 and 126 are connected to hub 122 for swinging movement in a vertical plane. Arm 124 is part of linkage 112, and arm 126 is part of linkage 114. Lugs 128 and 130 are affixed respectively to the bottom plates of carriers 60 and 66, and arms 124 and 126 are connected to lugs 128 and 130 by short link arms 132 and 134. An enlarged view of the connection of the link arm 124 to lug 128 by link arm 132 is shown in FIG. 5. A cam follower 136 on arm 124 engages in the eccentric cam groove 118, and another cam follower 138 on arm 126 engages in the cam groove 120 (FIGS. 2 and 3). It is apparent that as the cam 108 and 110 are rotated by shaft 116, the cam followers 136 and 138 ride in the respective cam groove 118 and 120 and force the link arms 124 and 126 to swing up and down thereby vertically reciprocating the carriages 60 and 66 out of phase with each other.

Figure 1:
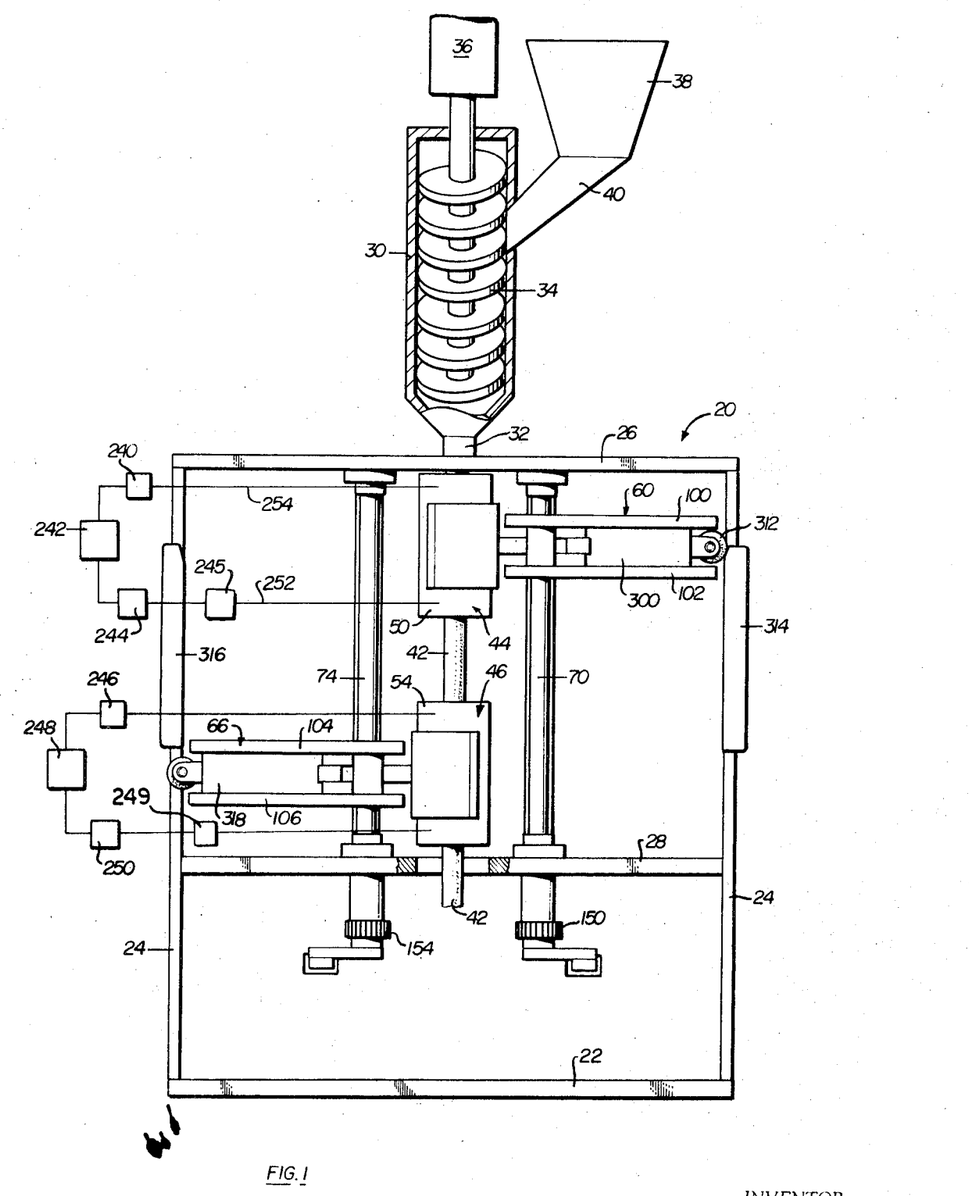
FIG. 1 is a front elevational view of a blow molding machine in accordance with one embodiment of the invention.

In FIGS. 1, 2 and 3 carriage 60 is shown at the top of its vertical motion, and carriage 66 is shown at the bottom of its vertical motion. As has been mentioned, the blow molds 44 and 46 are opened and closed as they reciprocate, and the mechanism for accomplishing this includes two drum cams 140 and 142, both mounted on shaft 116, and linkages generally designated 144 and 146 respectively connecting cams 140 and 142 to shafts 84 and 88. Shaft 84 is connected to shaft 86 by gears 148 and 150, and shaft 88 is connected to shaft 90 by gears 152 and 154 (see FIGS. 2 and 3). Drum cams 140 and 142 have cam grooves 156 and 158 extending about the circumference thereof and following laterally varying path about the cams. The shape of the top halves of cam grooves 156 and 158 is apparent in FIG. 2, and the bottom halves of these cam grooves are identical to the top halves.

Linkage 144 includes articulated link arms 160, 162, 164 and 166 (see FIG. 2). Similarly, linkage 146 includes articulated link arms 168, 170, 172 and 174. Arms 160 and 162 are rigidly connected together to form a bell crank pivoted at a point 176 fixed to a post 178 (see FIG. 3), and arms 168 and 170 are rigidly connected together to form a second bell crank pivoted at a point 180 fixed to a post similar to post 178. Arm 160 has a cam follower 182 at the end thereof engaging in cam groove 156, and arm 168 has a cam follower 184 at the end thereof engaging in cam groove 158 (see FIG. 2).

With the carriage 60 in its uppermost position, and the carriage 66 in its lowermost position as shown in FIGS. 1–3, blow mold halves 48 and 50 have just closed on the parison 42, and blow mold halves 52 and 54 are still closed but are just beginning to open. The cam grooves 156 and 158 as depicted in FIG. 2 reflect this condition. Shaft 116 rotates counterclockwise as viewed in FIG. 3. Thus, as viewed in FIG. 2, as cams 140 and 142 rotate through one-half of a revolution, cam follower 182 stays at the right to keep blow mold halves 48 and 50 closed while they travel downwardly, and cam follower 184 moves first to the right and then to the left to open and then close blow mold halves 52 and 54 as they travel. The condition of the blow molds as they pass each other midway of their travel is shown in FIG. 4. Here it can be seen that the open upwardly traveling blow mold halves 52 and 54 pass on the outside of the closed downwardly traveling blow mold halves 48 and 50. It is apparent that during the next half of a revolution of cams 140 and 142, cam follower 184 will stay to the left to keep blow mold halves 52 and 54 closed on the parison as they travel downwardly with the parison, and cam follower 182 will move first to the left and then back to the right to open and then close blow mold halves 48 and 50 as they travel upwardly. While blow mold halves 48 and 50 are open, they will pass on the outside of the closed blow mold halves 52 and 54. The cycle continues in this same fashion.

The action of linkage 144 will be described to illustrate the operation of both linkage 144 and 146. Link arm 164 is shown in FIG. 2 in a rearward position corresponding to the condition wherein blow mold halves 48 and 50 are closed. The linkage stays in this position until these mold halves reach the bottom of their travel. Then, cam follower 182 moves to the left, thus pivoting arms 160 and 162 counterclockwise to thereby push arm 164 forward and swing arm 166 clockwise. This rotates shaft 84 clockwise which in turn rotates shaft 86 counterclockwise through gears 148 and 150. Arms 56 and 58 then swing open to open the blow mold halves 48 and 50. The opening of the blow mold halves takes place in an initial portion of their upward movement. They remain open while they pass the downwardly traveling blow mold halves. Then cam follower 182 moves back to the right thus pivoting arms 160 and 162 clockwise to return the linkage 144 to its original condition. This obviously closes blow mold halves 48 and 50, and these mold halves become fully closed at the top of their vertical motion.

Figure 7:
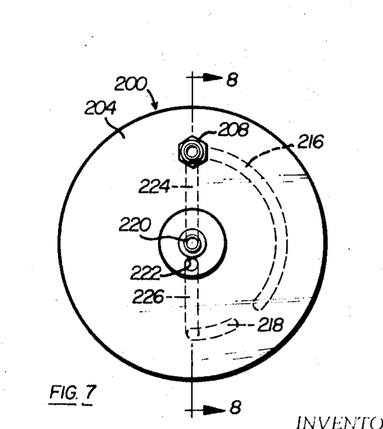
FIG. 7 is an end view, partly in section, of one valve device for supplying air to a blow mold of the machine.

As a given set of blow mold halves closes and travels downwardly, air under pressure is introduced into that blow mold and into the parison portion confined therein to inflate that parison portion into the interior shape of the blow mold. Any suitable mechanism for supplying air to the blow molds may be used, and valves 200 and 202 are provided on shaft 116 for this purpose in the illustrated embodiment. The construction of valve 200 is shown in FIGS. 7 and 8, and the construction of valve 202 is identical except that it is oriented to operate out of phase with valve 200.

A circuit disk 204 encircles shift 116 but is held in a stationary position. A bore 206 extends through disk 204, and a connector 208 is plugged into this bore. A flexible air line 210 extends from plug 208 to blow mold 44. Another circular disk 212 abuts a disk 204 in face-to-face contact, and disk 212 is keyed by a suitable key 214 to shaft 116 so that disk 212 rotates with the shaft. Disk 212 has a curved air passage 216, and other shorter curved passage 218 therein. An air pasage 220 extends axially through shaft 116 to one end thereof, and another air passage 222 extends through shaft 116 parallel to passage 220 but offset radially therefrom. An air passage 224 extends from passage 220 through shaft 116 and disk 212 to curved passage 216, and another air passage 226 extends from passage 222 through shaft 116 and disk 212 to curved passage 218.

Figure 8:
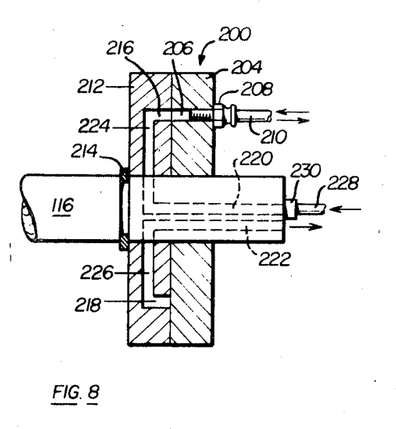
FIG. 8 is a sectional view taken along line 8—8 of FIG. 7.

Air under pressure is supplied from a suitable source through a tube 228 and a stationary connector 230 to the axial air passage 220, and air is exhausted from the radially offset air passage 222 to the atmosphere as indicated in FIG. 8 by the arrows. In FIG. 7, the disks 204 and 212 are shown in their condition when blow mold 44 is just beginning to travel downwardly. During the first portion of this downward travel, curved passage 216 remains in communication with bore 206, so air passes in through tube 228, connector 230, passages 220, 224, 216 and 206 to the air line tube 210 which leads to the blow mold 44. This air expands the parison portion within the blow mold to the desired blown shape. Shortly after the end of curved passage 216 passes bore 206, the other curved passage 218 comes into communication with bore 206. At this time, the pressurized air leaves the blown article and travels through passages 218, 226, and 222 to the atmosphere. During the next half revolution of disk 212, no air is supplied to blow mold 44 because it is open and traveling upwardly. During this portion of the cycle, air is supplied to the other blow mold 46 through valve 202.

As has been described, the blow molds 44 and 46 are refrigerated to minimize the chilling time of the parison, and this permits the machine to operate at very high speeds. As shown schematically in FIG. 1, each blow mold is connected in a refrigeration circuit. The refrigeration circuit for blow mold 44 includes a compressor 240, a condenser 242, an expansion valve 244 and an evaporator 245. Likewise, the refrigeration circuit for blow mold 46 includes a compressor 246, a condenser 248, an expansion valve 250, and an evaporator 249.

Considering blow mold 44 by way of example, vaporized refrigerant such as Freon is supplied to the blow mold from evaporator 245 via line 252. At this stage, the refrigerant is vaporized. The refrigerant passes through coils in heat exchange relation with the blow mold 44 as will be described in connection with FIGS. 9 and 10, and heat is transferred from the hot plastic material of the parison through the blow mold to the gaseous refrigerant. The vapors pass from blow mold 44 through line 254 to the compressor 240, and from there to the condenser 242 which removes heat from the vapors and causes them to condense to a liquid. The liquid may be supplied to a receptacle (not shown) and from there liquid is supplied to the expansion valve 244 and the evaporator 245 where it vaporizes and passes back through line 252 to the blow mold 44. This is merely an example of a suitable refrigeration circuit for refrigerating the blow mold 44. The refrigeration circuit for refrigerating the blow mold 46 operates in the same manner.

Figure 9:
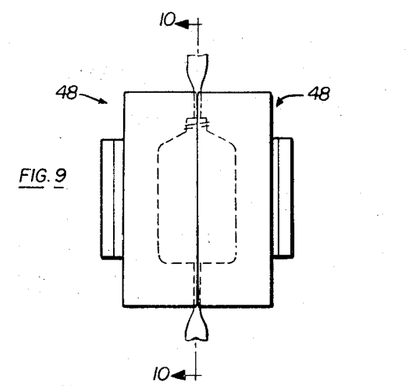
FIG. 9 is an elevational view of one of the blow molds included in the machine showing the manner of closing the blow mold on the parison.
Figure 10:
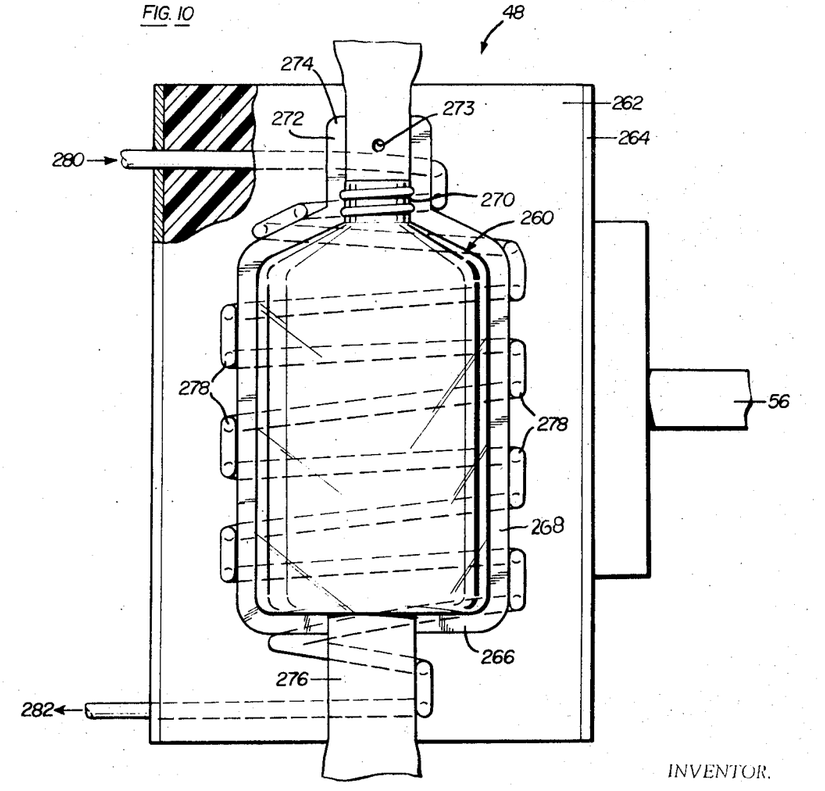
FIG. 10 is a sectional view (with parts shown in elevation) taken along plane 10—10 of FIG. 9.

A suitable construction for one blow mold half 48 is shown in FIGS. 9 and 10. The blow mold half 48 includes an electro-formed metallic surface 260 in the shape of half of a container. The electro-formed mold surface 260 is encapsulated in a silicone compound or equivalent material provided at 262, and the latter material is contained in an outer shell 264. The mold surface 260 includes a bottom portion 266, a side wall portion 268, and a neck portion 270 having a threaded interior as shown. A neck extension portion 272 opens onto the neck portion 270 and is provided with a blowing aperture 274 communicating with air line 210. Since blown air is supplied to line 210 at a pressure of 50 to 100 p.s.i., the air under pressure will rupture the still hot plastic material and inflate the tube interiorly of the mold. Following blow molding, air under pressure will be vented from the molded article through aperture 274. The mold is provided with upper and lower abutments 275, 276 which clamp the tube shut to either side of the mold neck extension 272 and the mold bottom 266, respectively. A coil of tubing 278 is wrapped about the mold surface 260 in a back and forth manner as shown in FIG. 9, and this coil is in heat exchange relation with the mold surface. Refrigerant enters the coil 278 at 280 and leaves the coil 278 at 282. It is apparent that the other mold half which cooperates with mold half 48 is provided with an identical heat exchange coil, and these coils are both connected in the refrigeration circuit for that mold.

The air which is introduced into each blow mold exerts considerable force on the mold halves after the parison has been expanded into contact with the mold halves, and this force tends to open the mold halves. In order to counteract this force and hold the mold halves closed, a biasing mechanism is provided for each blow mold as shown in FIG. 4. A hollow closer member 300 is provided between the plates 100 and 102 of the carrier 60, and this closer member is movable laterally relative to the mold halves 48 and 50. Closer member 300 is connected to arms 56 and 58 by a toggle linkage consisting of arms 302, 304, 306 and 308. Arm 302 is pivotally connected to closer member 300 and to arm 304 and arm 306 is pivotally connected to closer member 300 and to arm 308. Arms 304 and 308 are keyed to shafts 84 and 86 by the keys 92 and 94, and so are connected to arms 56 and 58. A movable member 310 is provided inside closer member 300, and member 310 has a cam follower roller 312 connected thereto. Cam follower 312 is adapted to contact a vertical cam 314 mounted on the frame of the machine. As shown in FIG. 1, another vertical cam 316 is provided at the left side of the machine to be engaged by the cam follower roller 318 for the carriage 66. A rod 320 is connected at one end to member 310 and extends through closer member 300 to a head 322 which seats against the left end of closer member 300. A coil spring 324 butts at one end against member 310 and at the other end against closer member 300, thus urging movable member 310 to the right as viewed in FIG. 4, so that head 322 butts up against the left end of closer member 300.

Figure 6:
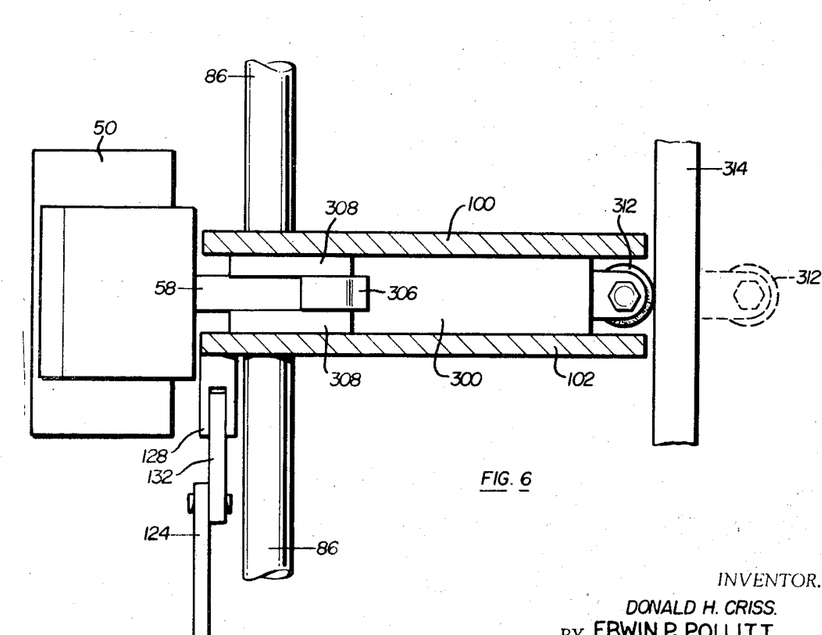
FIG. 6 is a vertical sectional view taken through one of the blow molds and associated carriage structures shown in FIG. 4.

Referring to FIG. 1, when the carrier 60 moves downward, cam follower roller 312 engages vertical cam 314 so that roller 312 and movable member 310 are pushed to the left, thus moving head 322 off its seat. This is the condition shown in FIG. 4. Spring 324 is compressed so that closer member 300 is urged to the left by the spring, and this force acts through the toggle linkage composed of members 302, 304, 306 and 308 to counteract the blowing force within the blow mold and keep the mold halves 48 and 50 closed. As carrier 60 continues traveling downwardly, roller 312 leaves the lower end of vertical cam 314, and the biasing force is then released from the blow molds. Just as the carrier starts its upward travel, the blow molds are opened as previously explained, and the opening of arms 56 and 58 extends the toggle linkage to move closer member 300 to the right so that cam roller 312 is extended out beyond vertical cam 314 to the position indicated in dashed lines in FIG. 6. Movable member 310 has an L-shaped configuration so that it clears vertical cam 314 when the carrier 60 moves upwardly. Roller 312 is actually outside cam 314 during this upward movement as indicated by the dashed line position of roller 312 in FIG. 6. When carrier 60 reaches its uppermost position, the mold halves 48 and 50 are fully closed again, and closer member 300 is again retracted to the position shown in FIG. 4.

The method of the invention is apparent from the foregoing description, and includes the steps of extruding a plasticized plastic parison vertically downward, closing a first blow mold on a first portion of the parison, moving the first blow mold downwardly with the parison and concurrently supplying gas under pressure to the first blow mold and into the parison portion therein to inflate the parison portion to a blown shape, closing a second blow mold on a second portion of the parison above the first parison portion, and opening the first blow mold. The first blow mold is then moved upward, and the second blow mold is moved downward while gas under pressure is supplied to the second blow mold and into the parison portion therein to inflate the second parison portion to a blown shape. The steps are repeated cyclically to blow mold a series of shapes in the parison while continuing to extrude the parison.

Thus, the invention provides a method of and apparatus for blow molding plastic articles in which the articles are refrigerated immediately after they are blown to reduce the chilling time, and in which a very high rate of production can be achieved to take advantage of the extremely short chilling time.

Having thus described our invention, we claim:

1. In a blow molding machine having a first set of separable blow mold halves, a second set of separable blow mold halves in vertical alignment with the blow mold halves of said first movable means, and an extruder mounted above said movable means to supply a plasticized plastic parison downwardly along a vertical path passing through said sets of blow mold halves, the improvements of spaced pairs of vertical guide means for said first set and said second set of blow mold halves respectively, means operatively connected to each of said sets of mold halves to reciprocate the same vertically out of phase with respect to each other and thus reciprocate each said set of mold halves vertically along said guide means, means operatively connecting each mold half to its guide means for co-rotation, and means for rotating the guide means for each of mold halves to close the same during downward travel thereof and to open the same laterally prior to its return upwardly so that each set of mold halves closes on the parison and travels downwardly therewith and the same set of mold halves when open passes upwardly outside the other set of closed mold halves, and means for supplying gas under pressure to each said set of mold halves during the downward travel thereof to inflate a portion of a parison therein.

2. The blow molding machine as claimed in claim 1 in which each of said sets of blow mold halves is vertically reciprocated by a cam and lever arrangement, respectively, and the cams are driven by a common shaft upon which the cams are located 180° out of phase to insure the proper timing of vertical blow mold reciprocation.

3. The blow molding machine as claimed in claim 2 wherein said common shaft carries an additional cam for each set of mold halves, and a lever connects each additional cam to one pair of said vertical guide means, so that the rotation of said common shaft both vertically reciprocates said blow mold halves and open and closes each set of blow mold halves.

4. A blow molding machine comprising a first pair of separable blow mold parts, a second pair of separable blow mold parts in vertical alignment with the first pair of mold parts, separate vertical guide rods for each mold part, respectively, first drive means operatively connected to said first and second pairs of mold parts to reciprocate said pairs of mold parts vertically along said guide rods and thus move said mold parts vertically along the same vertical path but out of phase with respect to each other, second drive means for concurrently rotating the guide rods for said pairs of mold parts in opposite directions relative to one another to open and close the corresponding pairs of mold parts, means interconnecting said first drive means and said second drive means to close each pair of said mold parts during the downward travel thereof and to open each pair of said mold parts prior to and during the upward travel thereof, so that the open mold parts pass outside the closed mold parts during the reciprocation thereof, means for supplying a plasticized plastic parison downwardly along said vertical path to be engaged alternately by said pairs of mold parts, and means for supplying gas under pressure to each pair of said mold parts during the downward travel thereof to inflate that portion of that parison engaged thereby.

5. The blow molding machine as claimed in claim 4 in which said first drive means includes (a) a first carriage and a first pair of arms respectively pivotally connecting said first pair of blow mold parts to said first carriage, (b) a separate second carriage and a second pair of arms respectively pivotally connecting said second pair of blow mold parts to said second carriage, and (c) a pair of rotary cams respectively connected to said first and second carriages by linkages, and said second drive means includes (a) a pair of rotary cams respectively connected to said first and second pairs of arms by said guide rods and (b) linkages connected between said last-named cams and said shafts, and said interconnecting means comprises a common drive for both pairs of rotary cams.

6. The blow molding machine as claimed in claim 5 including biasing means for each of said pairs of blow mold parts to hold the same closed against gas pressure therein, each of said biasing means including a closer member carried by one of said carriages for reciprocal movement therewith and also for movement laterally of the set of blow mold parts associated with said carriage, linkage means connecting said closer member to the arms for said mold parts for moving said closer member laterally outward upon opening of said mold parts and for moving said closer member laterally inward toward said mold parts upon closing of said mold parts, a cam follower with said closer member, a spring between said cam follower with said closer member, and a vertical cam engageable by said cam follower during downward movement of said carriage to flex said spring and thereby apply force to said closer member which is transmitted to said associated blow mold parts by said linkage means to hold said mold parts closed.

7. A blow molding machine comprising, a first blow mold including separable mold parts, a second blow mold including separable mold parts, first carrier means for carrying said first blow mold reciprocally along a predetermined vertical path, second carrier means for carrying said second blow mold reciprocally along the same vertical path out of phase with respect to said first blow mold, said first and second carrier means being spaced apart laterally, means for guiding the motions of said carrier means, a first pair of cam means operatively connected, respectively, to said first and second carrier means to alternately reciprocate the same vertically, a second pair of cam means operatively connected to said mold parts of said first blow mold and to said mold parts of said second blow mold, respectively, said second cam means being operative to close each of said blow molds during the downward travel thereof and open each of said blow molds laterally prior to and during the upward travel thereof so that the blow molds can pass each other without interference, common drive means for said first and second pairs of cams to correlate vertical movement of said blow molds with opening and closing movements thereof, means for supplying a plasticized plastic parison downwardly along said vertical path to be pulled downward alternately by said blow molds, and means for supplying gas under pressure to said blow molds during the downward travel thereof to inflate a portion of a parison therein.

8. A blow molding machine comprising, first movable means including first and second separable blow mold halves, second movable means including third and fourth separable blow mold halves, first rotary cam means operatively connected to said first movable means by a linkage to reciprocate the same vertically so that said first and second blow mold halves follow a predetermined vertical path, second rotary cam means operatively connected to said second movable means by a linkage to reciprocate said second movable means vertically so that said third and fourth blow mold halves also follow said predetermined vertical path out of phase with respect to said first and second blow mold halves, third rotary cam means operatively connected to said first and second blow mold halves and operative to close said first and second mold halves during the downward travel thereof and open said first and second mold halves laterally during the upward travel thereof, fourth rotary cam means operatively connected to said third and fourth blow mold halves and operative to close said third and fourth mold halves during the downward travel thereof and open said third and fourth mold halves laterally during the upward travel thereof, whereby the open mold halves pass outside the closed mold halves during the reciprocation thereof, means for supplying a plasticized plastic parison downwardly along said vertical path so that the pairs of mold halves alternately close on said parison and travel downwardly therewith, and means for supplying gas under pressure to said mold halves during the downward travel thereof to inflate the parison portion therein into a blown shape.

9. The blow molding machine as claimed in claim 8 in which said first, second, third and fourth rotary cam means are driven by a common drive means.

10. A blow molding machine comprising a frame, first and second vertical guide means supported by said frame and spaced laterally from each other, a first carrier movable vertically along said first guide means, a second carrier movable vertically along said second guide means and spaced laterally from said first carrier, a first blow mold including first and second mold halves, first and second arms connecting said first and second mold halves to said first carrier for swinging lateral movement of said mold halves, first and second shafts keyed to said first and second arms respectively and rotatable to swing said arms for opening and closing said first and second mold halves, a second blow mold including third and fourth mold halves in vertical alignment with said first and second mold halves, third and fourth arms connecting said third and fourth mold halves to said second carrier for swinging lateral movement of said third and fourth mold halves, third and fourth shafts keyed to said third and fourth arms respectively and rotatable to swing said arms for opening and closing said third and fourth mold halves, first rotary cam means operatively connected to said first carriage by a linkage to reciprocate said first carriage and said first blow mold vertically so that said first and second mold halves follow a predetermined vertical path, second rotary cam means operatively connected to said second carriage by a linkage to reciprocate said second carriage and said second blow mold so that said third and fourth mold halves follow said predetermined vertical path out of phase with respect to said first and second mold halves, third rotary cam means operatively connected to said first and second shafts and operative to rotate the same to close said first and second mold halves during the downward travel thereof and open the same laterally during the upward travel thereof, fourth rotary cam means operatively connected to said third and fourth shafts and operative to rotate the same to close said third and fourth mold halves during the downward travel thereof and open the same laterally during the upward travel thereof, whereby the open mold halves pass outside the closed mold halves during the reciprocation thereof, means for supplying a plasticized plastic parison downwardly along said vertical path so that the pairs of mold halves alternately close on said parison and travel downwardly therewith, means for supplying gas under pressure to said mold halves during the downward travel thereof to inflate a parison portion therein into a blown shape, first biasing means connected to said first and second arms, fifth cam means to actuate said first biasing means during downward travel of said first blow mold for urging said first and second mold halves closed against gas pressure therein, second biasing means connected to said third and fourth arms, and sixth cam means to actuate said second biasing means during downward travel of said second blow mold for urging said third and fourth mold halves closed against gas pressure therein.

11. The blow molding machine as claimed in claim 10 in which said first and second rotary cam means each comprise a circular element rotatable about a central axis and having a circular groove therein eccentric with respect to said axis, and said linkages connecting said first and second cam means to said carriages each include a cam follower engaging the groove of the respective wheel.

12. The blow molding machine as claimed in claim 10 in which said third and fourth rotary cam means each comprises a circular element having a circumferential groove in the rim thereof, said groove having an axially varying path, said wheel being connected to a pair of said shafts by a linkage including a cam follower engaging said groove.

13. In a molding machine having first and second separable mold parts, means for reciprocating said mold parts along a linear path, and means for opening said mold parts during a portion of their travel and closing said mold parts during another portion of their travel, the combination therewith of a biasing mechanism for holding said mold parts closed for a predetermined time comprising a closer member, means for carrying said closer member reciprocally with said mold parts and allowing lateral movement of said closer member, linkage means connecting said closer member to said mold parts for moving said closer member laterally outward from said mold parts upon opening of said mold parts and for moving said closer member laterally inward toward said mold parts upon closing of said mold parts, a cam follower with said closer member, a spring between said cam follower and said closer member, and a cam engageable by said cam follower during said another portion of the travel of said mold parts to flex said spring and thereby apply force to said closer member which is transmitted to said mold parts by said linkage means to hold said mold parts closed.

14. In a blow molding apparatus for use with an extruder for extruding a tube depending from an orifice, the improvements of a pair of vertical guide means laterally spaced to either side of said orifice and therebeneath, an openable and closable blow mold assemly guided on each of said guide means for movement thereon toward and away from said orifice, means securing each of said blow mold assemblies to its respective one of said guide means for arcuate movement therewith, means for turning said vertical guide means arcuate for opening and closing said blow mold assemblies, respectively, a rotatable shaft, a first pair of rotatably offset cam means rotatable with said shaft, a pair of crank arms interconnecting said first pair of cams and said blow mold assemblies respectively for alternately moving said blow mold assemblies vertically toward and away from said orifice, a second pair of cam means rotatable with said shaft, a second pair of crank arms interconnecting said second pair of cam means and said guide means for arcuately moving said guide means to open and close said blow mold assemblies, respectively, each of said second pair of cam means being rotatably correlated on said shaft with a corresponding one of said first pair of cam means to close the respective blow mold when it is vertically positioned adjacent the orifice and to open that blow mold when it is remote from said orifice, and power means for rotating such shaft.

15. A method of blow molding comprising (1) extruding a plasticized plastic parison vertically downward along a predetermined path, (2) vertically reciprocating first and second blow molds along separate pairs of guide rods parallel to said path, respectively, said first and second blow molds being reciprocated out of phase with each other so that when either blow mold is at the uppermost point in its travel the other blow mold is at the lowermost point in its travel, each of said blow molds including a pair of separable mold halves each keyed to one of said guide rods, (3) rotationally actuating that pair of guide rods upon which the first blow mold is reciprocated to close the first blow mold onto said parison while moving the first blow mold downwardly along said pair of guide rods at a speed correlated to the speed of the parison, (4) supplying gas under pressure to the downward traveling first blow mold and into the parison portions therein to inflate said parison portion into a blow shape, (5) reversely actuating said pair of guide rods to separate the mold halves of said first blow mold prior to and during movement of the one blow mold upwardly, the separated halves of the first blow mold being spaced laterally from each other on opposite sides of said path so that the upward travelling first blow mold halves pass on opposite sides of the downward traveling second blow mold, (6) and continuing the crycle by alternatively performing steps (3) through (5) on the first and second blow molds, respectively, to blow a series of shapes in the downward traveling parison.

References Cited

UNITED STATES PATENTS

| | | | |
|---|---|---|---|
| 2,579,399 | 12/1951 | Ruekberg | 18—5 BO UX |
| 2,712,732 | 7/1955 | McGrew | 62—528 X |
| 3,127,753 | 4/1964 | Tinnerman | 264—348 UX |
| 3,233,416 | 2/1966 | Rainwater et al. | 18—5 BH UX |
| 3,431,158 | 3/1969 | Poulsen | 264—173 X |

FOREIGN PATENTS

| | | | |
|---|---|---|---|
| 909,093 | 10/1962 | Great Britain | 264—99 |
| 63,781 | 10/1955 | France | 18—5 BP |
| | | (Add to 1,031,320) | |

ROBERT F. WHITE, Primary Examiner

J. H. SILBAUGH, Assistant Examiner

U.S. Cl. X.R.

18—5 BB, 5 BE, 5 BP